(12) United States Patent
Chae et al.

(10) Patent No.: US 11,889,476 B2
(45) Date of Patent: *Jan. 30, 2024

(54) METHOD WHEREBY TERMINAL TRANSMITS DATA TO ANOTHER TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,705

(22) Filed: Apr. 4, 2022

(65) Prior Publication Data

US 2022/0232526 A1    Jul. 21, 2022

Related U.S. Application Data

(63) Continuation of application No. 16/324,887, filed as application No. PCT/KR2017/008777 on Aug. 11, 2017, now Pat. No. 11,330,560.

(Continued)

(51) Int. Cl.
*H04W 56/00* (2009.01)
*H04W 72/02* (2009.01)
(Continued)

(52) U.S. Cl.
CPC ........... *H04W 72/02* (2013.01); *H04L 1/1642* (2013.01); *H04L 1/1819* (2013.01); *H04W 4/46* (2018.02); *H04W 72/0446* (2013.01)

(58) Field of Classification Search
CPC ... H04W 72/02; H04W 4/46; H04W 72/0446; H04L 1/1642; H04L 1/1819
(Continued)

(56) References Cited

U.S. PATENT DOCUMENTS

2016/0295624 A1* 10/2016 Novlan .................. H04L 67/12
2017/0188391 A1*  6/2017 Rajagopal ......... H04W 28/0284
(Continued)

FOREIGN PATENT DOCUMENTS

CN        102932919        2/2013
KR     1020160018244       2/2016
(Continued)

OTHER PUBLICATIONS

The State Intellectual Property Office of the People's Republic of China Application Serial No. 201780062618.2, Office Action dated Sep. 28, 2022, 12 pages.

(Continued)

*Primary Examiner* — Sai Ming Chan
(74) *Attorney, Agent, or Firm* — LEE, HONG, DEGERMAN, KANG & WAIMEY

(57) ABSTRACT

One embodiment of the present invention relates to a method whereby a terminal transmits data to another terminal in a wireless communication system, the data transmission method comprising the steps of: selecting resources for transmitting multiple pieces of data; and transmitting the multiple pieces of data by using the selected resources, wherein the terminal is configured to execute the transmission through sensing, and if the terminal fails to transmit the data a preset number of times or more in a row, the terminal reselects resources.

15 Claims, 12 Drawing Sheets

Related U.S. Application Data

(60) Provisional application No. 62/374,742, filed on Aug. 12, 2016, provisional application No. 62/374,710, filed on Aug. 12, 2016, provisional application No. 62/373,972, filed on Aug. 11, 2016.

(51) Int. Cl.
*H04W 4/46* (2018.01)
*H04L 1/1607* (2023.01)
*H04L 1/1812* (2023.01)
*H04W 72/0446* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2017/0332390 | A1* | 11/2017 | Li | .............................. H04L 5/16 |
| 2021/0289473 | A1 | 9/2021 | Chae et al. | |

FOREIGN PATENT DOCUMENTS

| | | |
|---|---|---|
| KR | 1020160079048 | 7/2016 |
| KR | 20160110959 | 9/2016 |
| WO | 2012173443 | 12/2012 |
| WO | 2015020484 | 2/2015 |
| WO | 2015113720 | 8/2015 |
| WO | 2015137687 | 9/2015 |
| WO | 2016078034 | 5/2016 |

OTHER PUBLICATIONS

Japan Patent Office Application No. 2021-122265, Office Action dated Nov. 1, 2022, 10 pages.
Samsung, "Prioritization of sidelink transmissions over uplink transmissions," R1-164766, 3GPP TSG RAN WG1 #85, May 2016, 3 pages.
United States Patent and Trademark Office U.S. Appl. No. 16/324,887, Office Action dated Jul. 8, 2021, 15 pages.
Korean Intellectual Property Office Application No. 10-2019-7007029, Notice of Allowance dated Apr. 29, 2021, 2 pages.
PCT International Application No. PCT/KR2017/008777, Written Opinion of the International Searching Authority dated Nov. 28, 2017, 20 pages.
European Patent Office Application Serial No. 17839871.5, Search Report dated Mar. 20, 2020, 8 pages.
Intel, "Scheduling Assignment for Sidelink V2V Communication", 3GPP TSG RAN WG1 Meeting #85, R1-164141, XP051096573, May 2016, 8 pages.
Samsung, "Semi-persistent transmission support for SL", 3GPP TSG RAN WG1 Meeting #84bis, R1-162677, XP051080342, Apr. 2016, 6 pages.
European Patent Office Application Serial No. 17839871.5, Office Action dated Feb. 24, 2022, 7 pages.
Ericsson, "Discussion on V2X PC5 Scheduling, Resource Pools and Resource Patterns", R1-165276, 3GPP TSG RAN WG1 Meeting #84bis, Apr. 2016, 8 pages.
Qualcomm Incorporated, "Resource reselection counter and triggering conditions", R1-1702520, 3GPP TSG-RAN WG1 Meeting #88, Feb. 2017, 3 pages.
Japan Patent Office Application No. 2019-507833, Office Action dated Jan. 14, 2020, 8 pages.
Samsung, "Triggering conditions for resource reselection", 3GPP TSG RAN WG1 Meeting #85, R1-164760, May 2016, 4 pages.
Motorola, "eD2D CR for 36.213", 3GPP TSG RAN WG1 Meeting #82bis, R1-156385, Oct. 2015, 17 pages.
NTT Docomo, "Discussion on Resource Control and Selection for PC5 based V2V Communications", 3GPP TSG RAN WG1 Meeting #84, R1-161049, Feb. 2016, 5 pages.

\* cited by examiner

FIG. 5
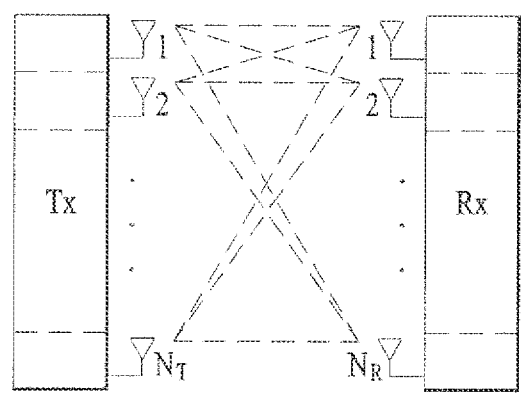
(a)
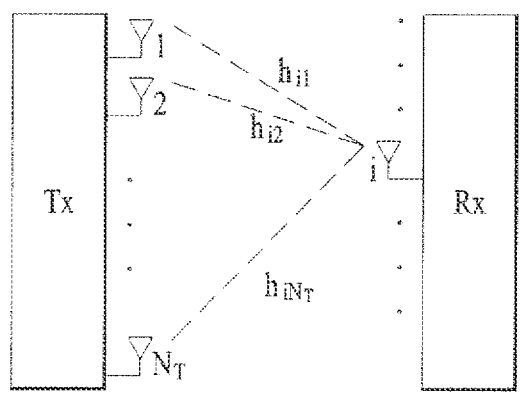
(b)

FIG. 8
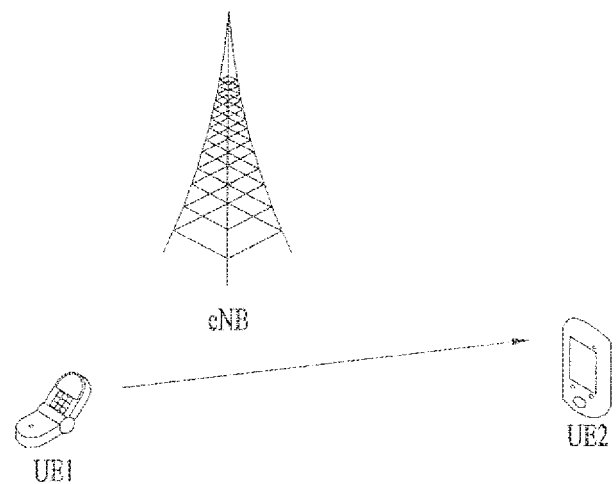
(a)
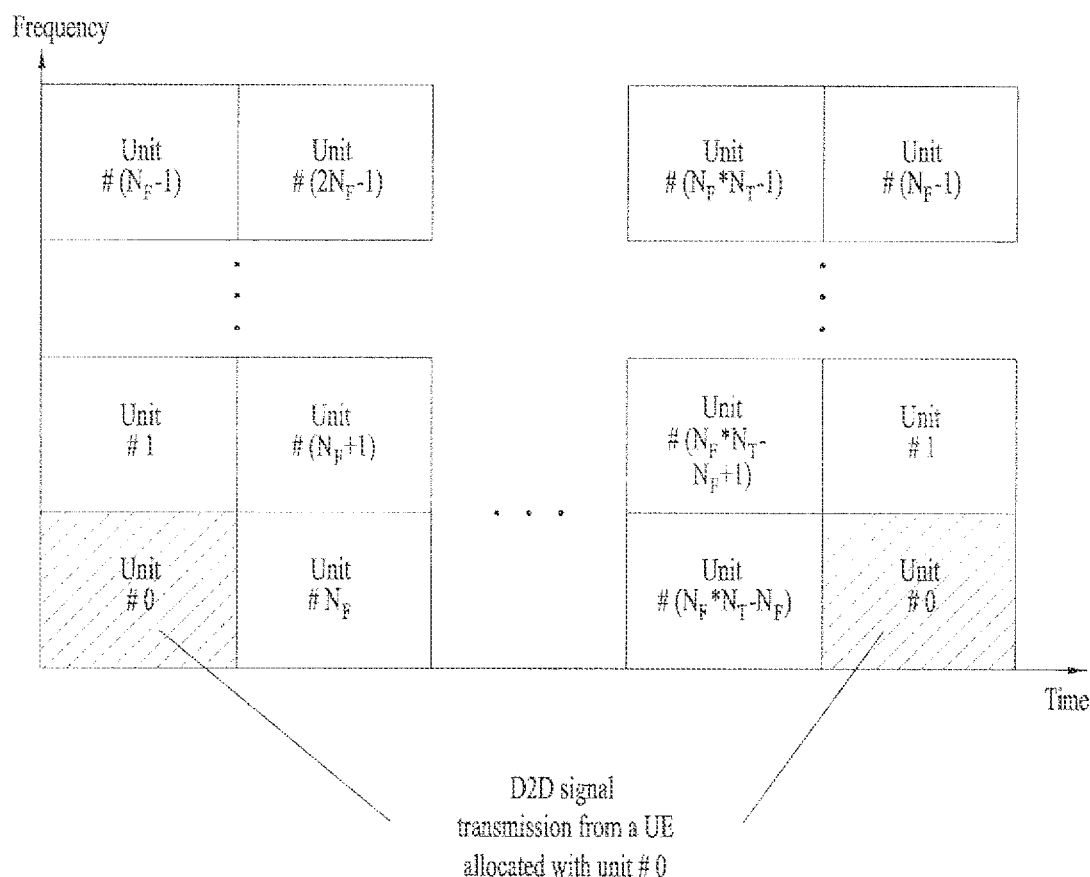
D2D signal
transmission from a UE
allocated with unit # 0
(b)

METHOD WHEREBY TERMINAL TRANSMITS DATA TO ANOTHER TERMINAL IN WIRELESS COMMUNICATION SYSTEM

CROSS-REFERENCE TO RELATED APPLICATIONS

This application is a continuation of U.S. patent application Ser. No. 16/324,887, filed on Feb. 11, 2019, which is the National Stage filing under 35 U.S.C. 371 of International Application No. PCT/KR2017/008777, filed on Aug. 11, 2017, which claims the benefit of U.S. Provisional Application Nos. 62/373,972, filed on Aug. 11, 2016, 62/374,710, filed on Aug. 12, 2016, and 62/374,742, filed on Aug. 12, 2016, the contents of which are all hereby incorporated by reference herein in their entireties.

TECHNICAL FIELD

The present disclosure relates to a wireless communication system, and more particularly, to a method and apparatus for selecting resources semi-persistently and transmitting data to another user equipment (UE) by a UE.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An aspect of the present disclosure is to define semi-persistent resource selection and reselection, and a relationship among the length of a resource pool bitmap, the period of semi-persistent resource allocation/configuration, and a system frame number (SFN) period.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting data to another user equipment (UE) by a UE in a wireless communication system includes selecting resources for transmitting a plurality of data, and transmitting the plurality of data in the selected resources. The UE is configured to perform a transmission by sensing, and if the UE fails in transmitting the data successively a predetermined number of or more times, the UE performs resource reselection.

In another aspect of the present disclosure, a UE for transmitting data to another UE in a wireless communication system includes a transmitter and receiver, and a processor. The processor is configured to select resources for transmitting a plurality of data, and to transmit the plurality of data in the selected resources. The UE is configured to perform a transmission by sensing, and if the UE fails in transmitting the data successively a predetermined number of or more times, the UE performs resource reselection.

The selected resources may be repeated every semi-persistent resource allocation period.

The resource reselection may be performed irrespective of a counter value for resource reselection.

The selected resources may be indicated as available for data transmission and reception by a bitmap.

A length of the bitmap may match a generation period of a cooperative awareness message (CAM).

The bitmap may be applied repeatedly within a system frame number (SFN) period.

The length of the bitmap may be a common factor between the semi-persistent resource allocation period and the SFN period.

Advantageous Effects

According to the present disclosure, in semi-persistent resource allocation/configuration, excessive resource reselection of a UE can be prevented, and data can be transmitted more rapidly with increased reliability.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings:

FIG. 5 is a view illustrating the configuration of a wireless communication system having multiple antennas;

FIG. 8 is a view illustrating an exemplary D2D resource pool for D2D communication;

BEST MODE FOR CARRYING OUT THE INVENTION

Figure 1:
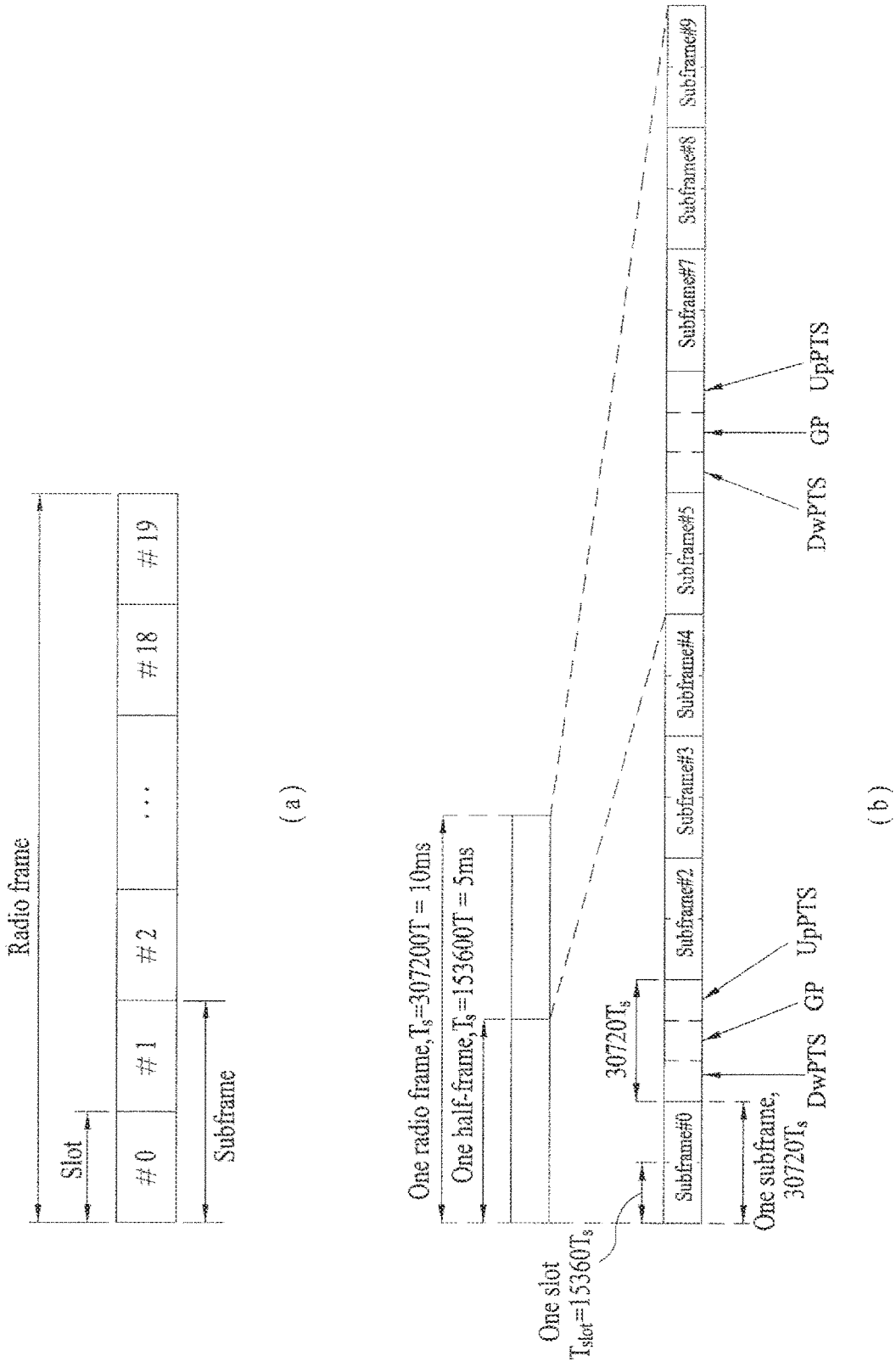
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
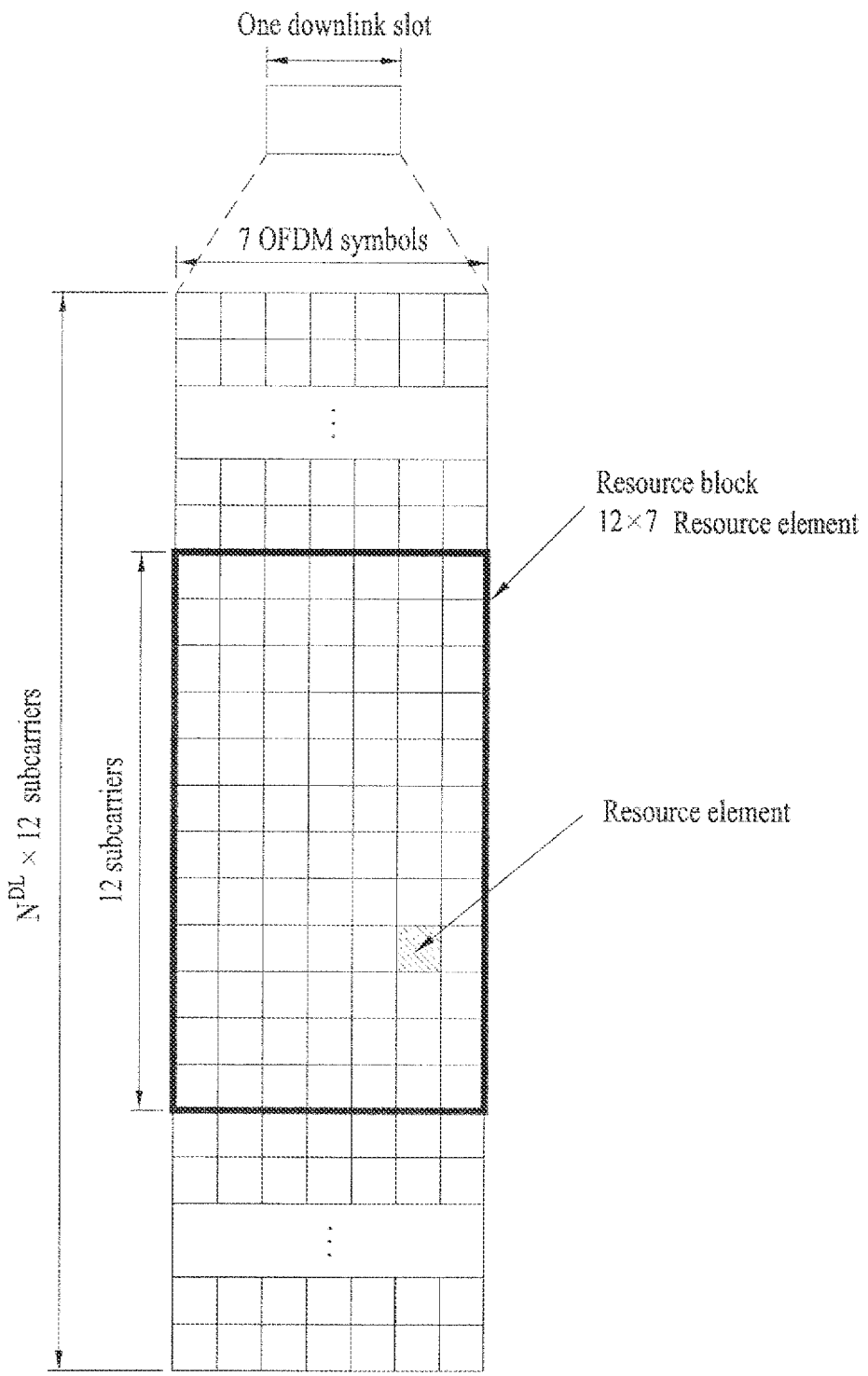
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
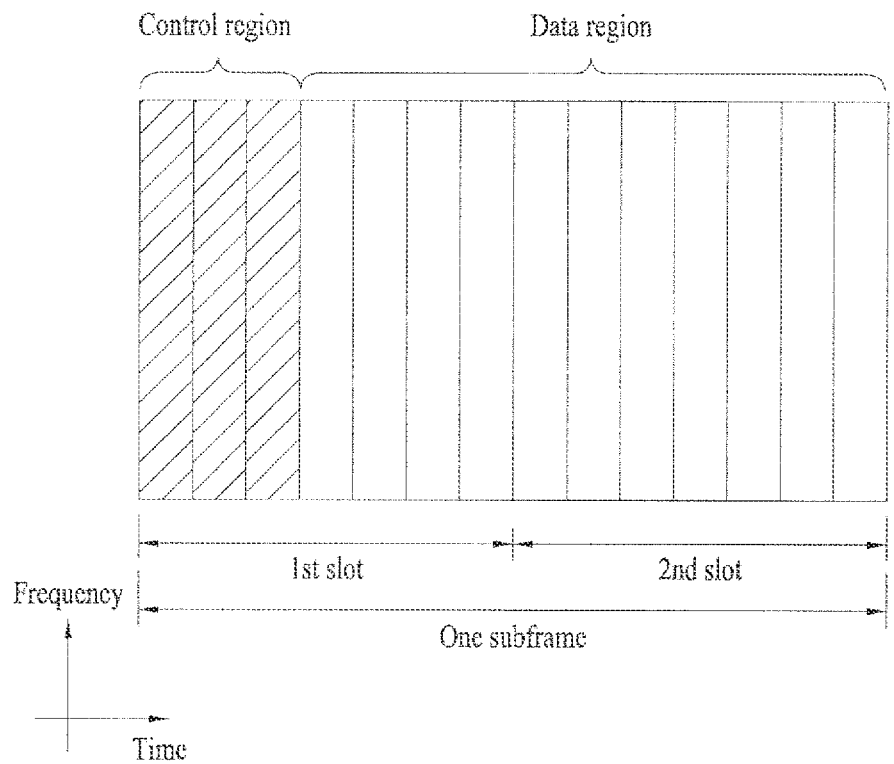
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
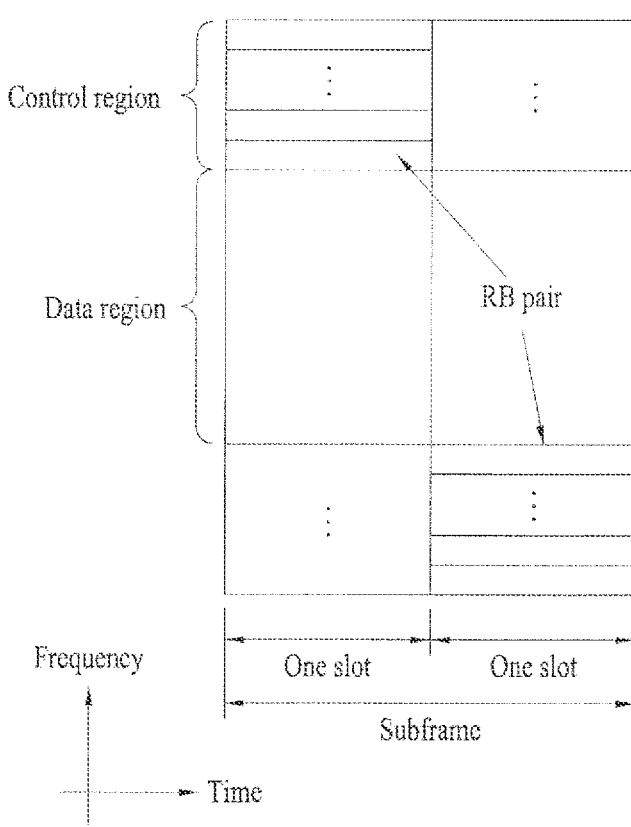
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:
i) Demodulation-reference signal (DM-RS) used for channel estimation for coherent demodulation of information delivered on a PUSCH and a PUCCH; and
ii) Sounding reference signal (SRS) used for an eNB or a network to measure the quality of an uplink channel in a different frequency.

The downlink RSs are categorized into:
i) Cell-specific reference signal (CRS) shared among all UEs of a cell;
ii) UE-specific RS dedicated to a specific UE;
iii) DM-RS used for coherent demodulation of a PDSCH, when the PDSCH is transmitted;
iv) Channel state information-reference signal (CSI-RS) carrying CSI, when downlink DM-RSs are transmitted;
v) Multimedia broadcast single frequency network (MBSFN) RS used for coherent demodulation of a signal transmitted in MBSFN mode; and
vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_N$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{s}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{s}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y=[y_1,y_2,\ldots,y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T=[h_{i1},h_{i2},\ldots,h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n=[n_1,n_2,\ldots,n_{N_R}] \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx+n \quad \text{[Equation 10]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T,N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
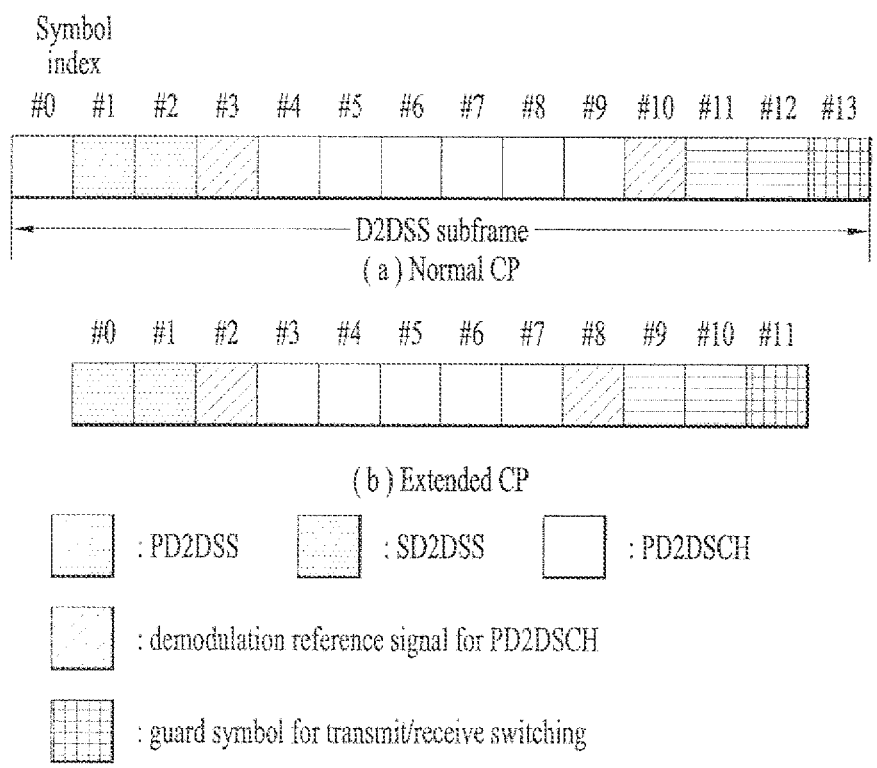
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
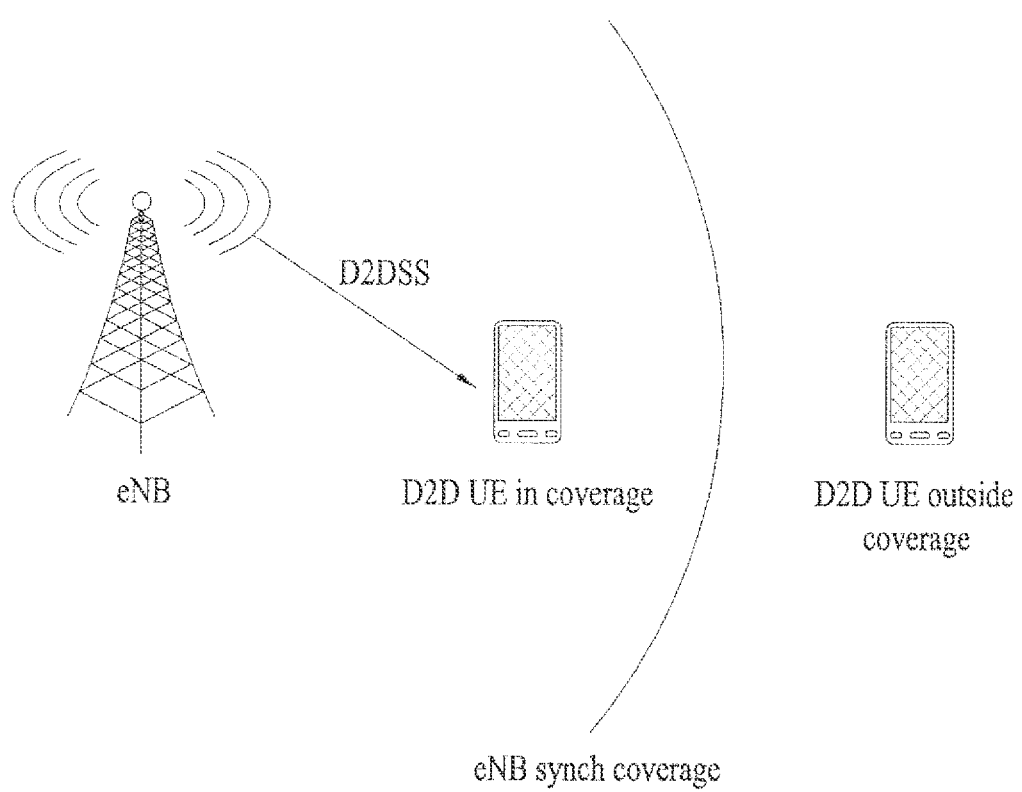
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
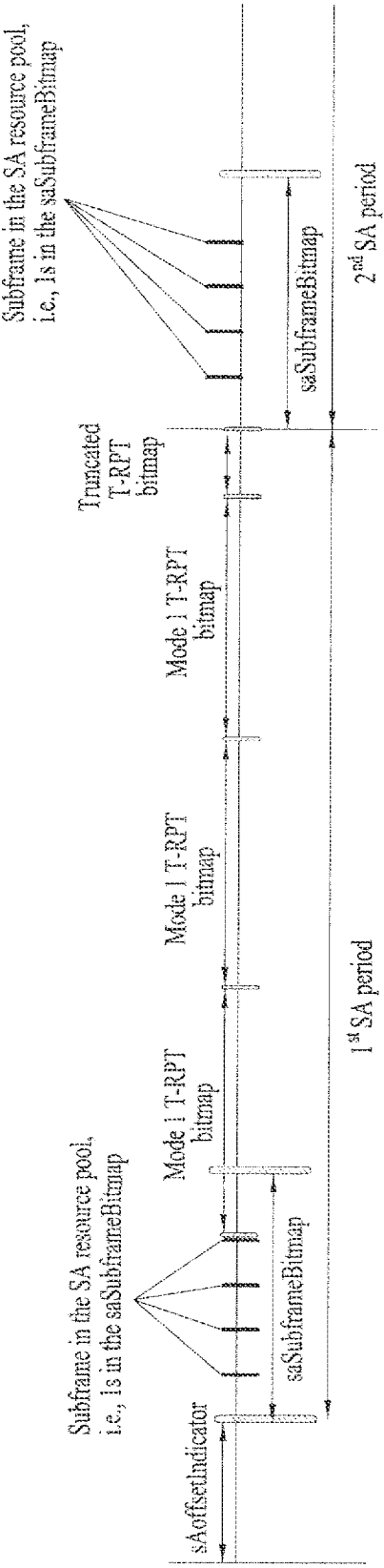
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to 1s set in a T-RPT bitmap in an indicated T-RPT, and transmits one medium access control layer protocol data unit (MAC PDU) four times.

In V2V communication, a cooperative awareness message (CAM) of a periodic message type, a decentralized environmental notification message (DENM) of an event triggered message type, and so on may be transmitted. The CAM may deliver dynamic state information about a vehicle, such as a direction and a speed, static data of the vehicle, such as dimensions, an ambient illumination state, basic vehicle information such as details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. Having a higher priority may mean that in the case of simultaneous transmission of messages at a UE, the UE transmits a higher-priority message above all, or a message having a higher priority earlier in time among the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

Figure 10:
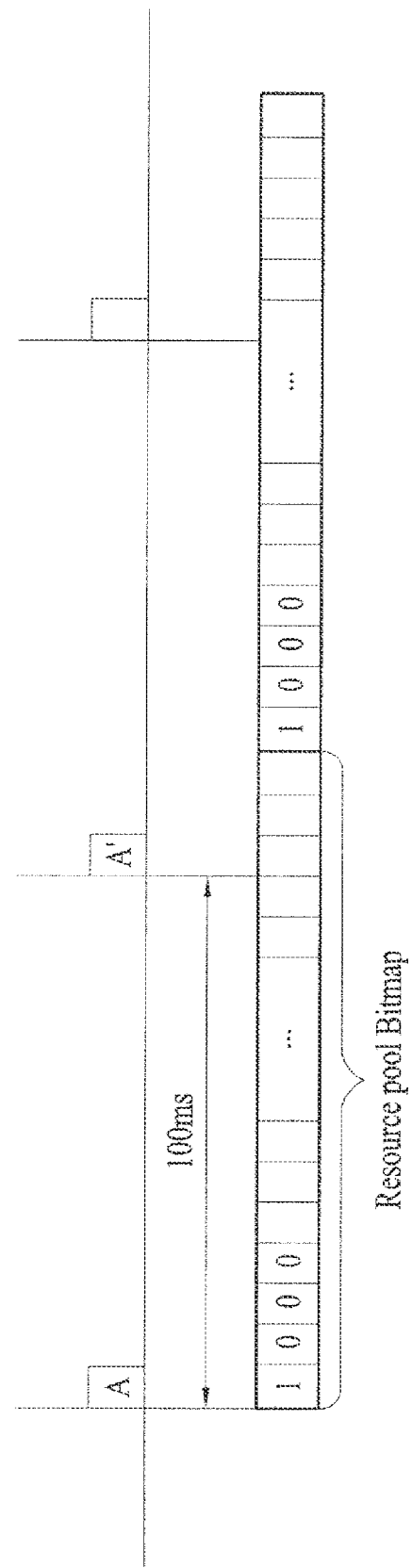
FIG. 10 is a view illustrating a problem before an embodiment of the present disclosure.

When a UE performs a D2D transmission, the UE may select resources semi-persistently. Specifically, for example, in the case where the UE transmits packets in every predetermined period, once the UE selects resources, the UE may keep the selected resources for a predetermined time within the packet transmission period, for stable interference measurement of other UEs. That is, a semi-persistent resource allocation method may be applied/used to/in D2D communication. The semi-persistent resource allocation method may advantageously enable neighbor UEs to stably measure interference, and stably maintain transmission resources, when a packet is generated in every predetermined period. Meanwhile, the UE may select multiple resources in consideration of multiple retransmissions. The semi-persistent resource allocation method may be based on sensing. That is, this method may be a sensing-based semi-persistent resource allocation method. However, if in semi-persistent resource allocation, there is no relation among a configuration period of a direct communication resource area (a D2D or sidelink resource pool) (a sidelink resource pool period or a semi-persistent resource allocation/configuration period), the length of a resource pool bitmap (the length of a bitmap for a sidelink resource pool configuration), and a system frame number (SFN) period, the UE may reserve resources outside a resource area or perform a transmission in resources different from resources used at an initial transmission. Specifically, as illustrated in FIG. 10, the UE may transmit a packet every 100 ms, and select resources (A in FIG. 10) within 100 ms, for the packet transmission. Once the UE selects the resources and transmits a signal in the selected resources, the UE may also perform a transmission in the selected resources (A' in FIG. 10) during the next 100 ms. The UE may perform this operation during transmission of a specific message (e.g., by setting a counter value at an initial resource selection, and maintaining the counter value by 1 (or decrementing the counter value by 1) each time a transport block (TB) is transmitted). However, if the period of a sidelink resource pool or the length of a bitmap for a sidelink resource pool configuration (the length of a resource pool bitmap) is not a multiple or factor of 100, it may occur that the next resources (A' in FIG. 10) are transmitted in a different resource pool from the initial transmission resource pool of the UE, or reserved resources do not belong to the sidelink resource pool. In this case, the UE may have to perform a transmission in a different resource area, cause unnecessary interference to another channel (e.g., a UL channel), or have to drop a packet to be transmitted. Now, a description will be given of semi-persistent resource selection and reselection, data transmission in the selected and reselected resources, and definition of a relationship among the length of a resource pool bitmap, a semi-persistent resource allocation/configuration period, and an SFN period according to embodiments of the present disclosure.

Semi-Persistent Resource Selection and Reselection

According to an embodiment of the present disclosure, a UE may select resources for transmission of a plurality of data, and transmit the plurality of data in the selected resources. The UE is configured to perform the transmission based on sensing. If the UE fails in transmitting the data successively a predetermined number of or more times, the UE may reselect resources. The selected resources may be repeated in every semi-persistent resource allocation period. That is, the UE selects data/packet transmission resources which will be used repeatedly in every semi-persistent resource allocation period by sensing, and transmits a plurality of data/packets and/or data and a retransmission of the data in the repeated resources in every period. If the UE fails in data/packet transmission successively a predetermined number of or more times in the selected/reserved resources, the UE reselects resources.

That is, it is regulated that in the case where resources are reserved semi-persistently in a specific resource area, if packets are dropped successively a predetermined number of or more times, resources are reselected. If resource reselection is performed even upon occurrence of one or two packet drops, the probable presence of multiple UEs performing reselection may result in unstable interference measurement. Only when packets have been dropped a predetermined number of or more times, or reserved resources are unavailable a predetermined number of or more times (e.g., currently reserved resources may not be used because the size of the currently reserved resources is not feasible, a latency requirement is not satisfied, or a UL transmission should be performed), resource reselection may be performed restrictively, thereby preventing excessive resource reselection. Further, if resources are unavailable successively, data transmission may be performed in reselected resources without waiting until all of the reserved resources are gone, thereby increasing transmission reliability. Further, the predetermined number based on which resource reselection is performed may be determined in consideration of one or more of factors including the number of UEs participating in D2D or V2X communication, the (average) speed of the UE, a network congestion state, a sensing threshold, the capability of the UE, and so on. The predetermined number may be determined by the network or the UE. In the former case, the predetermined number may be indicated to the UE by high-layer or physical-layer signaling.

The resource reselection may be performed irrespective of a counter value set for resource reselection. Further, the selected resources may be indicated as available for data transmission and reception by a bitmap. Further, the bitmap may be applied repeatedly within an SFN period.

Further, it may be regulated that in the case where resources are reserved semi-persistently in a specific resource area, if the UE fails in performing up to N transmissions within a predetermined time by selecting resources outside the resource area, resource reselection is performed. Further, it may be regulated that in the case where resources are reserved semi-persistently in a specific resource area, if the resource area is changed in the middle of time, or resources outside the resource area are reserved, a packet outside the resource area is dropped, or resource reselection is performed irrespective of a counter value.

Relationship Among Length of Resource Pool Bitmap, Semi-Persistent Resource Allocation/Configuration Period, and SFN Period First, the length of a resource area bitmap (the length of a resource pool bitmap) may be aligned with a semi-persistent resource allocation/configuration period. When the UE uses resources semi-persistently, the length of the resource pool bitmap may be set to a multiple or factor of the semi-persistent resource allocation/configuration period. That is, the length of the bitmap may match a generation period of a CAM. Specifically, in case resources are semi-persistently used/reserved every 100 ms as is the case with the CAM, the length of the resource area bitmap (the length of the resource pool bitmap) is also set to a factor or multiple of 100 ms. When the network configures a sidelink resource area, the network may signal a resource area bitmap (a resource pool bitmap) and/or an offset at which the bitmap starts to be applied to the UE by a physical-layer or high-layer signal. UEs participating in the sidelink fill an SFN period (10240 ms) by repeating a 100-ms bitmap, starting from a time obtained by applying the offset to subframe 0 of SFN 0. If the semi-persistent allocation/configuration period is Xms, a factor or multiple of X may be included/correspond in/to the length of a bitmap for a resource area configuration (the length of a resource pool bitmap).

For a resource area of a serving cell, the offset may be set to 0 or no offset may be signaled. The offset is a value used to signal a resource area of an adjacent cell by the serving cell in an asynchronous network. The network may separately signal a bitmap for a plurality of resource areas to the UE, and the UE may assume that a sidelink signal is transmitted/received only in the positions of subframes corresponding to is in the bitmap.

If the length of the resource pool bitmap is not a factor of 10240, it is proposed that the 10240-ms period is filled by repeating the bitmap, and truncating a last one of the repeated bitmaps. For example, if a 100-ms resource pool bitmap is used on the assumption of a 100-ms semi-persistent resource allocation/configuration period, the bitmap is repeated, starting from subframe 0 of SFN 0, and the last of the repeated bitmaps is applied from its beginning to 40 ms, with the remaining part truncated. This operation is intended to eliminate the ambiguity of a resource area, when UEs configure a resource area according to an SFN period, and the length of a resource area configuration bitmap does not match the SFN period.

Secondly, the length of a bitmap may be set to a common factor between a semi-persistent resource allocation period and an SFN period. In other words, a common factor (the greatest common factor) between a semi-persistent scheduling (SPS) period (the semi-persistent resource allocation/configuration period) and the SFN period (10240) is set as the length of a resource pool bitmap. In this case, there may be no deviation from a resource area in an SPS operation, and the resource area may be prevented from being non-contiguous and aperiodic in the SFN period. For example, given an SPS period of 100 ms, the resource area bitmap may be 10 ms or 20 ms long. Meanwhile, given an SPS period of 200 ms, the resource area bitmap may be 10 ms, 20 ms, or 40 ms long.

Meanwhile, in the CAM generation method of ETSI, a packet generation period varies from 100 ms up to 1000 ms. If an available SPs period increases by a unit of 100 ms, 100, 200, 300, . . . , 1000 ms may be available as the SPS period. To avoid deviation from a resource pool in every period during an SPS operation, the length of the resource pool bitmap is preferably determined to be the minimum of the greatest common factors between the respective available SPS periods and the SFN period (10240). Then, there may be no deviation from the resource area throughout the SPS operation.

In addition, the network may signal configurable SPS periods by a physical-layer or high-layer signal. For example, a bitmap indicating the upper and lower bounds of configurable SPS periods, configurable SPS period values, or used SPS periods (e.g., if 100, 200, 400, and 800 are used among 100, 200, . . . , 1000 is used, a bitmap of 1101000100) may be signaled to the UE. Or these configurable SPS periods may be preset. The UE may select a specific one of the configurable SPS periods, and perform an SPS operation according to the selected SPS period. The network may use the minimum of common factors between the configurable SPS periods and 10240 as the length of a resource pool bitmap. For example, for a UE which uses SPS periods of 200, 400, 500, and 1000, the greatest common factors between the SPS periods and 10240 are 40, 80, 20, and 40, respectively, and thus the minimum of the greatest common factors, that is, 20 is used as the length of the resource pool bitmap.

Meanwhile, even though the length of the resource pool bitmap is set to a factor or multiple of the SPS period, it may occur that resources are reserved outside the resource area at the boundary of the SFN period. For example, since only 40 ms of the last bitmap of the SFN period is used with the remaining part truncated, and the bitmap starts again in SFN 0, for a UE which has selected resources in the last 40 ms, a subframe after the next 100 ms may not be a sidelink resource area. As such, when resources reserved with an SPS period are not a sidelink resource area at the boundary of an SFN period, it may be regulated that a corresponding packet is dropped and/or resource reselection is necessarily performed irrespective of a counter value. Or it may be regulated that when SFN 0 returns, all UEs perform resource reselection.

Scrambling Sequence

For the PSCCH in LTE Release 12/13 D2D, a scrambling sequence is fixed to $c_{init}$=510 In V2V, the scrambling sequence of the PSCCH may vary according to a subframe index so as to achieve a higher randomization gain.

Proposal 1: In PC5 V2V, the scrambling sequence of the PSCCH may vary according to a subframe index.

Regarding the PSSCH scrambling sequence, the scrambling sequence changes according to a subframe index. An initialization seed of the PSSCH scrambling sequence is given by $c_{init}=n_{ID}^{SA}\cdot 2^{14}+n_{ssf}^{PSSCH}\cdot 2^{9}+510$. A DMRS sequence is a function of priority information. This differentiates a DMRS sequence having a certain priority from DMRS sequences having other priorities. The same mechanism is applicable to a scrambling sequence. The scrambling sequence of the PSSCH may be a function of priority information.

Proposal 2: The scrambling sequence of the PSSCH may be a function of priority information.

Since semi-persistent transmission is applied in V2V, consistent collision should be avoided. If a DMRS and a scrambling sequence change as a function of a TB number or RV, if two UEs use the same resources, a randomization gain may be achieved.

In a sensing operation, if independent resource selection is applied between retransmissions, frequency hopping may not be necessary.

Proposal 3: If independent resource selection is applied between retransmissions, frequency hopping is not used in PC5-based V2V of LTE Release 14.

Sensing

Now, a description will be given of details of sensing with reference to the following cited documents.

[1] R1-166821, 'Remaining details on DMRS for PSCCH and PSSCH', LG Electronics.

[2] R1-166825, 'Sensing details for UE autonomous resource selection mode in PC5-based V2V', LG Electronics.

1) Resources own transmission excluded: The UE may not measure in its transmission subframe. In this case, a transmission subframe including SA transmission and data transmission within a sensing window is preferably excluded. When the UE excludes a transmission subframe for resource selection, the UE will finally change a subframe when reselection is triggered, and consistent collision caused by a half duplex constraint may be avoided.

2) Option in step 2: It is preferable to downselect an option in step 2. Direct measurement of data may be more accurate than direct measurement of data through energy measurement of an SA resource. Since actual in-band emission interference is not the same in real UE implementation, in-band emission emulation is not the same between UEs. Accordingly, performance improvement brought by in-band emission emulation of data resources through SA energy measurement is not practical but possible only on a computer simulation.

3) The phrase 'indicated or reserved by a decoded SA' is defined as follows. If the resources of associated data are within a sensing window [n-a, n-b], all decoded SAs should be considered.

4) Details of a threshold: In step 2, a threshold is dependent on a priority level. The network may configure a threshold dependent on a priority level, and the UE may exclude a resource for a packet having a higher priority. The threshold is a function of the priority of a detected SA and the priority of data to be transmitted. Further, this threshold is dependent on a congestion level. For other congestion levels, the UE may apply a (pre)configured and congestion level-dependent offset to a sensing threshold. For example, the UE may apply a lower threshold at a low congestion level in order to determine resource occupancy.

5) b value: Because b>0, b may be fixed to 1. However, if so, the sensing results of subframe n–1 and subframe n may not be reflected. Accordingly, it is preferable to reset b from b>0 to b=0.

6) Granularity sensing: in the frequency domain: Basically, the UE may determine a sensing granularity according to the size of an RB carrying a message. If sub-channelization is not supported, serious resource fragmentation may occur. However, sub-channelization may be supported, partial overlap may not occur, and the energy sensing granularity of data may be based on a sub-channel size.

In summary,

Proposal 1: The UE excludes a transmission subframe including an SA transmission and a data transmission in a sensing window.

Proposal 2: Option 2-1 is supported in step 2.

Proposal 3: If the resources of associated data are within a sensing window [n-a, n-b], every decoded SA should be considered.

Proposal 4: A threshold is a function of the priority of a detected SA and the priority of data to be transmitted.

Proposal 5: It is reasonable to set b to 0.

Proposal 6: A sensing granularity in the frequency domain is equal to the size of a sub-channel.

Data Resource Selection

To satisfy latency requirements, the value of d should not be too large. The UE should exclude time resources beyond the latency requirements from a message generation time. dmax may be determined at the MAC layer. This exclusion may be incorporated in step 2.

Proposal 1: dmax should not be too large in order to fulfill latency requirements. dmax may be determined at the MAC layer. It is necessary to clarify the meaning of subframe 'n'. Resource (re)selection is performed only in the presence of a message to be transmitted. Similar content is set forth in LTE Release 12/13 D2D of TS36.321.

Proposal 2: Subframe n is a reselection triggering subframe. When the UE has a packet to be transmitted, the UE may trigger resource re(selection).

In step 3, option 3-2 is preferable.

Step 3-1: The UE measures the remaining PSSCH resources based on total received energy, prioritizes the measurements, and selects a subset.

The subset includes X % of resources having the lowest energy. X is configurable.

Step 3-2: The UE randomly selects one resource from the subset. When X=100, pure random selection may be applied between non-excluded resources.

Proposal 3: Option 3-2 is supported in step 3.

To mitigate the half duplex constraint and achieve an HARQ combining gain, retransmission resources for a transport block (TB) should be considered. When a retransmission is performed in step 3, 'resource' should be clarified. The following two alternatives are available.

Alternative 1: Independent selection for each (Re)Transmission

Each SA reserves a transmission in a single subframe. Like a DSCH, each transmission involves an SA. It may be difficult to include such an independent resource allocation in one SA. For HARQ combining, the SA may require HARQ process ID, new data indicator (NDI), and redundancy version (RV) fields. In addition, there is a certain resource selection constraint between an initial selected resource and a next selected resource in order to reduce HARQ buffering. The constraint may be realized in step 2. When the UE sequentially selects resources, the selected resources previously affect resource exclusion. For example, it may be excluded in step 2 that the UE selects an initial subframe n+d1, from subframe n+d1−a to subframe n+d1, and a is (pre-)configured by the network or by a fixed value. (For every TB and every (re)transmission), an independent SA transmission is similar to a DL asynchronous HARQ operation. To reduce unnecessary UE buffering, the time difference between (re)transmissions of a TB may be limited by a threshold.

Alternative 2: Selection of resource set including all (re)transmissions

Each SA may reserve all subsequent (re)transmissions. In this case, the following problem may occur. What combination of (re)transmission resource positions to be considered by the UE may become an issue. If an initial transmission and a retransmission take place at different frequency positions, an SA should present a multi-frequency resource indication field. Therefore, the overhead of an SA bit size is generated. A method of indicating the time/frequency position of (re)transmission resources in a single SA may be problematic. A mechanism such as T-RPT may be used, or a plurality of time offsets between an SA and data may be indicated by the SA.

Alternative 1 between the two alternatives is preferable. Alternative 1 may have a common design of SA content irrespective of association between an SA and data, and reduce the size of the SA content. For retransmission resource selection, the single carrier property should be considered. When the UE selects multiple transmission resources, the UE should sequentially select the resources, and exclude the resources of previously selected subframe(s).

Proposal 4: Each SA reserves a transmission in a single subframe.

Proposal 5: When the UE selects multiple transmission resources, the UE should sequentially select the resources, and exclude the resources of previously selected subframe(s)

SA Resource Selection

Cmin should ensure a processing time of a transmitting UE. Since a sensing window does not include subframe (n−b), if b=1, the UE monitors subframe (n−1001) to subframe (n−2). After the monitoring, the UE selects a resource required to transmit an SA. If a minimum processing time is 4 subframes, the UE may transmit the SA in subframe (n+2), that is, Cmin=−2+4=2. Meanwhile, resource selection is triggered in subframe n, and the UE may make a decision in subframe n and transmit its SA in subframe (n+4). b=0 and the sensing window needs to include subframe n. Otherwise, the UE is not capable of reflecting subframes (n−1) and n.

Proposal 6: A UE processing time, i.e., c>=n+4 is required in sensing and SA transmission operations.

The UE may select data resources based on sensing. In RAN1 #84bis, a time interval is selected from a configurable range by a transmitting UE in a UE-autonomous resource selection mode. The time difference between an SA and data is transmitted by the SA. The UE first selects resources for associated data. In relation to SA positions that may be associated with the selected data resources (e.g., time positions limited by a configured range of time intervals between an SA and data), the steps of data resource selection may be applied for SA resource selection. A threshold and a value X may be different from those used in the data resource selection.

Proposal 7: The steps of data resource selection for SA resources may be applied to SA positions associated with selected data resources (e.g., time positions limited by a configured range of time gaps between an SA and data).

A main advantage of a reservation operation lies in that a UE estimates the interference level of upcoming resources based on the sensing result of a previous time window. Reselection of many resources in this operation may lead to performance degradation. To reduce unnecessary resource reselection, SA resources should be reselected only when associated data resources are reselected.

Proposal 8: SA resources are reselected by associated data resources

Contents of resource reservation indication

'e' represents the time position of a resource reservation. A CAM may be generated every 100 ms to 1000 ms under circumstances. Since a vehicle does not move instantaneously, the location, direction, and speed of the vehicle may change gradually. Accordingly, a UE may estimate a time when a CAM is generated, for a short time. Further, with application of an appropriate timing margin to absorb the timing jitter of a message generation period, the resource drop problem that when a packet does not arrive, a UE cannot use reserved resources may be overcome. For these reasons, there is no need for reserving resources every 100 ms, and an excessive resource reservation may occur every 100 ms. In this operation, a reservation period j is explicitly signaled by an SA.

Proposal 1: A reservation period i is explicitly signaled.

Preferably, J is fixed in the LTE standard specification, that is, J=1. This option may reduce the bit size of an SA. Another option is that J (equal to a counter value) is transmitted by an SA. In any of the cases, there should be an explicit indication SA indicating whether the UE is to change resources at a next transmission.

Proposal 2: J is fixed to 1 in the LTE standard specification.

Definition of Congestion Level Measurement

It is defined that congestion level=(number of busy data (or SA) resources in T)/(number of total data (or SA) resources in T).

Herein, T represents a measurement time interval, which may be fixed or (pre)configured by the network. If the measured DMRS power (such as RSRP) or received energy (such as RSSI) exceeds a threshold or is indicated by SA decoding, the resources are declared as 'in use' Each resource may be a PRB or a PRB group. For example, the resource may be identical to a sub-channel. The threshold may be (pre)configured. The UE may perform measurement in each resource pool. The UE may calculate the average of the measurements of resource pools. However, if resource pools are divided according to UE types, for example, if one resource pool is for a pedestrian UE (P-UE) and another resource pool is for a vehicle UE, per-resource pool measurements should also be separated.

Use of Measurement

Similarly to dedicated short range communications (DSRC), a congestion level measurement may be used for applying transmission parameters. For example, the congestion level measurement may be used to determine a message size, a message generation speed, an MCS, an RB size, the number of retransmissions, and transmission power. To apply transmission parameters, two solutions may be considered. One of the solutions is an application layer-based solution, and the other is a wireless layer-based solution. In the application layer-based solution, the UE reports a congestion measurement, and the application layer indicates or changes a packet size and/or a message generation speed. In the wireless layer-based solution, the wireless layer may adjust an MCS, an RB size, the number of retransmissions, and power. The UE may report its congestion level measurement to the eNB. The eNB may control a resource pool size and a transmission parameter range. In view of limited time for V2V WI, it is preferable to defer reporting a congestion level measurement to an eNB and defining a related UE operation to V2X WI.

Proposal 2: In view of the limited time of the V2V WI, it is preferable to defer reporting a congestion level measurement to an eNB and defining a related UE operation to the V2X WI.

Time Resource Pool Configuration

In RAN1 #84b, it was determined to multiplex an SA and an associated data pool in frequency division multiplexing (FDM) from the perspective of a system. The SA and its associated data may occupy contiguous or non-contiguous RBs, and may be transmitted in the same or different TTIs. The FDMed resource pool design offers the following advantages.

First, the FDMed resource pool may decrease a latency. The FDMed resource structure enables immediate transmission of an SA and associated data. On the contrary, a TDMed structure requires transmission of an SA and data in respective resource pools. Another advantage is that in-band emission is mitigated during SA transmission. In the TDMed resource structure, more SAs are transmitted in an SA pool, thereby increasing mutual in-band emission. Further, this method may relieve the half duplex problem.

Secondly, another advantage of the FDMed resource pool configuration is that FDMed and TDMed transmissions of an SA and associated data are supported from the perspective of a single UE. Meanwhile, if a TDMed resource pool structure for an SA and data is designed, a TDMed SA and data that does not satisfy the agreements of RAN #1 84b (e.g., an SA and associated data transmitted in the same TTI) may be supported.

Proposal 1: SA resources and data resources are always FDMed from the perspective of a system.

If a SA resource pool and a data resource pool are always FDMed from the perspective of the system, signaling for a resource pool configuration may be reduced. In LTE Rel-12/13 D2D, an SA resource pool bitmap and a data resource pool bitmap are transmitted by individual signals because two resources pools are TDMed, while a single bitmap may be transmitted in a V2V signal in order to configure a sidelink subframe common to an SA pool and a data pool.

Proposal 2: In PC5-based V2V, a single bitmap is signaled in order to configure sidelink subframes for both of an SA and a data pool.

In LTE Rel-12 D2D communication, a sidelink control (SC) period has been defined to configure a resource pool. However, the concept of an SC period is not necessary in an infinite V2V resource structure. A resource pool bitmap is repeated within an SFN (10240 ms).

Proposal 3: The concept of an SC period is not necessary for a resource pool configuration. A resource pool bitmap is repeated within an SFN (10240 ms).

For V2V resource allocation, semi-persistent scheduling and sensing are used. In the sidelink semi-persistent resource allocation mechanism, a general message transmission period is a multiple of 100 ms. In LTE Rel-12/13 D2D, however, the length of a resource pool, which is {40, 80, 160, 320} msec in FDD and TDD configurations 1 to 5, {70, 140, 280} msec in TDD configuration 0, and {60, 120, 240} msec in TDD configuration 6, is not divisible by 100 ms. That is, when the UE reserves resources every 100 ms, some resources may not reside within a sidelink resource pool. Accordingly, new resource pool bitmap lengths such as 10 (a common divisor between 100 and 10240) and 20 (the greatest common factor between 100 and 10240) are proposed. Specifically, the bitmap length is preferably the greatest common factor between an SPS period (100, 200, . . . , 1000) and an SFN period (10240). If multiple SPS periods are supported, the bitmap length should be equal to the minimum of the maximum common denominators of the SPS periods.

However, since a bitmap length is designed based on the duration of an HARQ process, a legacy resource pool bitmap length is better for co-existence between PC5 and Uu. A new introduced bitmap is suitable for a V2V dedicated carrier. However, it is preferred to use the legacy bitmap length for a shared carrier. The network may select an appropriate bitmap length according to a situation.

Proposal 4: In PC5-based V2V, new bitmap lengths, for example, 10 and 20 (common divisors between 100 and 10240) are additionally used/introduced for a resource pool configuration. The network may select an appropriate bitmap length according to a situation. For example, a legacy bitmap length may be used for a shared carrier, whereas a new bitmap length may be used for a dedicated carrier.

As described before, when a legacy resource pool bitmap is used, some of reserved resources may be outside a resource pool. In this case, since a packet may not be transmitted within the resource pool, the packet is dropped. To avoid packet loss, if some of reserved resources are located outside a resource pool, resource reselection may be triggered.

Proposal 5: If reserved resources are located outside a resource pool, a packet is dropped, and resource reselection may be triggered.

Frequency Resource Pool Configuration

Figure 11:
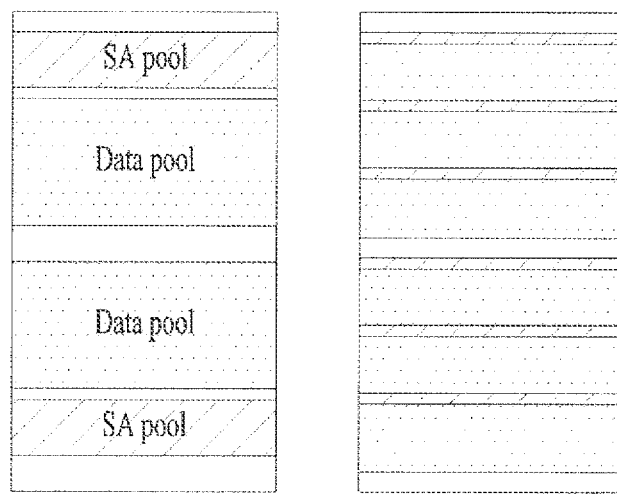
FIG. 11 is a view illustrating exemplary resource pools.

To configure a frequency resource pool, a signaling method for an SA and a data pool as defined in LTE Rel-12 may be reused. Starting and ending offsets, and a subband size are signaled by the network. In RAN1 #85, it was agreed to allow a resource pool definition in which an SA and associated data transmitted in the same subframe are always adjacent. FIG. 11 illustrates exemplary resource pools. This resource pool structure may not be implemented by the frequency resource pool signaling of LTE Rel-12. Accordingly, there is a need for a new method of additionally supporting an interleaved SA and data pool. The new signaling requires new information such as the number of subbands.

Proposal 6: The following two methods may be used to indicate frequency resources of a resource pool.

One of the methods is to reuse the LTE Rel-12 signaling method for an SA and a data pool. An SA and data may be used in TDM or FDM in non-adjacent PRBs. The other method is a new method of additionally supporting an interleaved SA and data pool. This is used for an SA/data FDMed in adjacent PRBs.

Sub-Channelization

The motivation of sub-channelization may be summarized as follows.

1) Reduction of sensing complexity: While energy sensing is performed in a data resource pool, a sensing granularity may be based on a sub-channel size. A sub-channel includes a group of RBs in the same subframe. This reduces computational complexity, compared to PRB-level sensing.

2) Reduction of resource fragmentation: If any resource position may be selected, resources may be fragmented.

3) Reduction of the bit size of a resource indication: If all UEs select resources based on a sub-channel, the bit size of a resource indication may be reduced. However, the RA bit size of an SA is not reduced, for future release and future flexibility.

Figure 12:
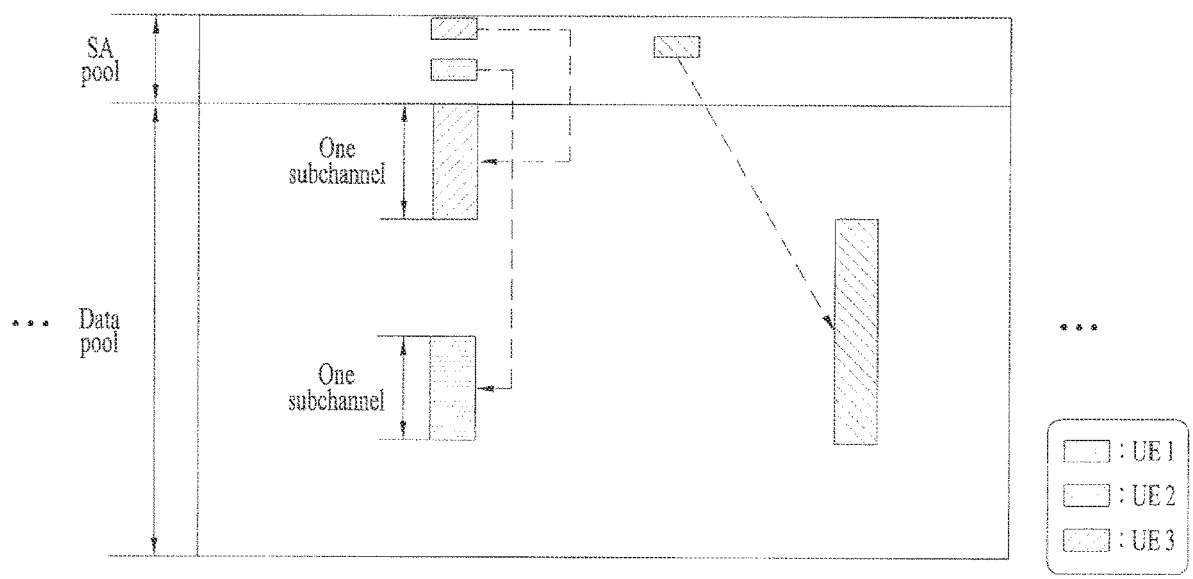
FIG. 12 is a view illustrating exemplary sub-channelization.

While energy sensing is performed in a data resource pool, a sensing granularity may be based on a sub-channel size. A sub-channel includes a group of RBs in the same subframe. To satisfy a PSD regulation in an ITS carrier, each sub-channel may include distributed RBs. The sub-channel size of a resource pool may be configured by the eNB or preconfigured. The sub-channel size should be equal in the resource pool. Different sub-channels should have separate groups of RBs. A frequency resource allocation granularity is equal to the size of a sub-channel in order to reduce the number of indication bits. FIG. 12 illustrates an example of sub-channelization.

Proposal 7: Sub-channelization is supported for PC5-based V2V.

SCI Contents

It is desirable to design the same size of SCI contents irrespective of a resource pool structure and the time/frequency resources of an SA and associated data, so that impacts on the legacy LTE are minimized, and the blinding decoding complexity of a receiving UE is reduced.

Proposal 1: The same size of SCI contents are designed irrespective of a resource pool structure and the time/frequency resources of an SA and associated data.

It is preferable to re-design PSSCH contents for LTE Rel-12/13 D2D since there is an unnecessary or inefficient field for PC5-based V2V operations.

Frequency resource allocation: Although an existing frequency resource allocation field indicates resource allocation in RBs, sub-channelization may be performed for resource allocation because the size of a PC5-based V2V message is limited. For example, if there are 50 RBs for a system bandwidth which may be divided into five sub-channels, RA bits may be reduced to 4 bits by ceil (log 2 (5*6/2)). However, it may be preferable to keep the same RB-level resource indication as in legacy LTE, for future flexibility.

Sequence generation or source ID: A V2V operation is broadcast and seeks safety, which obviates the need for a group destination ID. However, to randomize a scrambling sequence and DMRS sequence of data, some ID may be included in an SA. A sequence ID from a higher layer may be an option for randomization. The 8 LSBs of a destination ID are replaced with those of a source ID. As another option, an explicit field may be delivered in an SA.

Time offset between PSCCH and PSSCH: In RAN1 #84bis, it was agreed that a scheduling timing between an SA and associated data is variable. To support this flexibility, a time offset between the SA and the data may be indicated by the SA. If the time offset is 0, the SA and its associated data may be FDMed from the perspective of a single UE. Otherwise, the time offset is not 0, and the SA and the data may be TDMed according to the time offset.

Priority: In RAN1 #85, it was agreed that SCI explicitly includes priority information.

NDI, RV, and HARQ process ID: These fields are used for HARQ combining of data. An HARQ process ID may be combined with a sequence generation ID.

MCS: An MCS field is necessary.

Information on 'e': This field indicates the periodicity of reservation. For i, 4 bits may be assumed to indicate in [0, 10].

Reserved bits for future release: A CIF field may be considered. If a multi-carrier operation is supported, a carrier frequency transmitting SA may be different from carrier frequency transmitting data. Some of reserved bits may be considered for other purposes.

CRC: A 16-bit CRC field may be considered.

In conclusion, the proposed SCI contents are given as illustrated in Table 1 below.

TABLE 1

No TA in SA since it was agreed that N_TA_SL = 0 in RAN1 #85.
The number of SA bits including CRC should be less than 64 to confirm the working assumption which RAN4 is working on.
Possible content
  MCS (5 bits)
  Source ID (8 bits)
  Resource allocation (up to 13 bits)
  Time offset to the associated data (3 bits)
  Priority (3 bits using the same number of PPPP)
  NDI (1 bit)
  RV (2 bits)
  HARQ (or sidelink) process ID (3 bits)
  Information on 'e' (4 bits assuming indication in [0, 10] for i)
  Reserved field for future release.
  CRC (16 bits)

Meanwhile, in RAN1 #85, there is a working assumption that a V2V SSSS uses a sequence of a subframe-5 SSS to avoid synchronization source confusion between a D2D UE and a V2V UE. Similarly, it was agreed that a DMRS symbol position of a PSBCH for V2V is different from a DMRS symbol position as defined in legacy LTE Rel-12/13.

Proposal 1: An SSSS for V2V uses a sequence of a subframe-5 SSS.

In RAN1 #83, the following was agreed in relation to V2V synchronization.

SLSS and PSBCH transmission of a UE is supported for PC5-based V2V.

The UE capability of SLSS transmission will be discussed later.

The LTE Rel-12/13 physical format of the SLSS/PBSCH is the starting point, and the FFS number and position of a PSBCH DMRS, a PSSS root index, an SLSS ID, and so on are discussed later.

The LTE Rel-12/13 synchronization procedure (e.g., synchronization reference priority) is the starting point, and PBSCH contents are discussed later. "a GNSS or a GNSS equivalent is at the highest priority of synchronization source for time and frequency when a vehicle UE directly receives the GNSS or the GNSS equivalent with sufficient reliability and does not detect any cell in any carrier." RAN1 needs to study the impact of this existing agreement on Uu operation.

The following synchronization procedure described in Table 2 should be supported.

TABLE 2

Priority of synchronization source includes at least transmission timing reference.
  FFS whether there is any differentiation depending on whether eNB is synchronized to GNSS in the corresponding SLSS transmissions
  SLSS transmitted from out-coverage UE directly synchronized with GNSS or GNSS equivalent with sufficient reliability is differentiated from SLSS_net with in coverage indicator 1
  At least reuse priority order SLSS_net with in coverage indicator 1, SLSS_net with in coverage indicator 0, SLSS_oon
    FFS: any new priorities can be defined if benefits are shown
    FFS: Definition of SLSS_net, SLSS_oon
    FFS: GNSS or GNSS equivalent priority
  Working assumption: Priority of SLSS transmitted from in-coverage UE directly synchronized with GNSS or GNSS equivalent with sufficient reliability is the same as that of SLSS_net with in coverage indicator 1
    FFS: SLSS transmitted from in-coverage UE using GNSS or GNSS equivalent is configured by eNB
      FFS: whether the configured SLSS uses the same configuration as Rel-12 D2D SLSS or not
    FFS: SLSS transmitted from in-coverage UE using GNSS or GNSS equivalent is taken from SLSS_net with in coverage indicator 1
    FFS: Periodicity of synchronization resource
FFS: Criteria to select between signals received with the same priority (e.g., up to UE implementation)

From the working assumption, the priority of an SLSS transmitted from an in-coverage UE directly synchronized with the GNSS is equal to the priority of SLSS_net with an in-coverage indicator set to 1. Further, an SLSS transmitted from an out-coverage UE directly synchronized with the GNSS is differentiated from SLSS_net. The priority of the SLSS transmitted from the out-coverage UE directly synchronized with the GNSS is equal to that of SLSS_net with a non-volatile indicator 1 because there is no reason to differentiate GNSS-based synchronization signals between an in-coverage UE and an out-coverage UE.

For out-of-coverage, the priorities of synchronization sources are given in Table 3 below.

TABLE 3

P1: GNSS
P2: the following SLSS signals have the same priority:
  SLSS_net with in-coverage indicator 1
  SLSS_net_GNSS (one ID is reserved for UE directly synchronized with GNSS) with in-coverage indicator 1
P3: the following SLSS signals have the same priority:
  SLSS_net with in-coverage indicator 0
  SLSS_net_GNSS with in-coverage indicator 0
P4: SLSS_oon with in-coverage indicator 0

Proposal 2: One ID of SLSS_net is reserved for a GNSS-based synchronization signal. Eventually, the ID+168 is reserved for a direct GNSS-based UE Proposal 3: For out-of-coverage, the priorities of synchronization sources are given in Table 4 below.

TABLE 4

P1: GNSS
P2: the following SLSS signals have the same priority:
  SLSS_net with in-coverage indicator 1
  SLSS_net_GNSS (one ID is reserved for UE directly synchronized with GNSS) within-coverage indicator 1
P3: the following SLSS signals have the same priority:
  SLSS_net with in-coverage indicator 0
  SLSS_net_GNSS with in-coverage indicator 0
P4: SLSS_oon with in-coverage indicator 0

An SLSS is always lower than an eNB. Otherwise, a new RRM requirement needs to be implemented to test synchronization reference transition from the eNB to the SLSS. Considering the low priority of this issue, the benefit is not clear.

Selection of reference carrier for PC5-based V2V: If there is no eNB in a PC5 carrier, the UE may derive a timing reference from one of a Uu carrier and an eNB carrier. This function has already been specified in LTE Rel-13.

Proposal 4: The eNB may indicate a carrier to be used for a timing reference and DL measurements in a PC5 carrier.

Further, it is observed that a 4-bit PSBCH has an error floor with the agreed DMRS structure. A bit number need to be changed. Table 5 illustrates PSBCH decoding performance for different PSBCH bit sizes.

TABLE 5

| AWGN | | BLER | |
| | | #0: Puncturing at RX | |
| SNR | nBit | No | Yes |
| −6 | 40 | 0.0024 | 0.75 |
| | 41 | 0.0001 | 0.0001 |
| | 48 | 0 | 0.0007 |
| | 32 | 0 | 0.0002 |

In the above table, "No" means that symbol #0 is used, and "Yes" means that symbol #0 is punctured. When the first symbol is punctured, the block error rate (BLER) performance has an error floor.

Observation 1: The 4-bit PSBCH has an error floor with the agreed DMS structure.

Proposal 5: A reserved bit size may be changed in order to avoid poor BLER performance of the PSBCH.

In RAN1 #85, it is assumed that the SLSS/PSBCH period is 200 ms. However, this period is not divisible by the SFN period, which may result in detection failure of a synchronization signal between SFN periods. Particularly, the PSBCH decoding performance of a single shot may not be appropriate at a high speed. In this case, the UE should obtain a D2D frame number (DFN) by accumulating multiple PSBCH receptions or attempt multiple decodings for multiple PSBCH receptions. If the 200-ms SLS/PSBCH period is used, the UE may not accumulate multiple SLSSs/PSBCHs at a boundary of the SFN period. As a result, a synchronization latency may increase.

Proposal 6: The SFN period should be divisible by the SLSS/PSBCH period. For example, the SLSS/PSBCH period should be 80 or 160 ms.

The foregoing descriptions are applicable to UL or DL, not limited to direction communication between UEs. Herein, an eNB or a relay node may use the proposed methods.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by an eNB.

Apparatus Configuration According to Embodiment of the Present Disclosure

Figure 13:
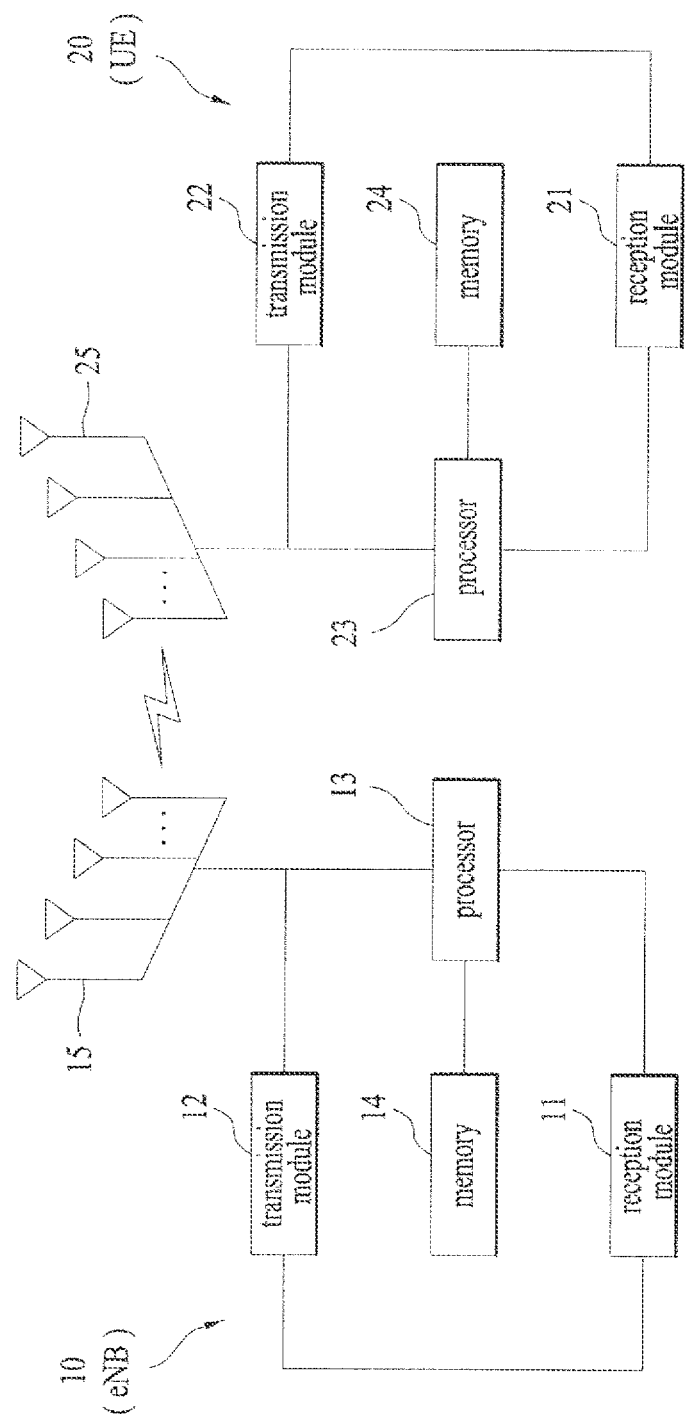
FIG. 13 is a block diagram of a transmission apparatus and a reception apparatus.

FIG. 13 is a block diagram of a transmission point and a UE according to an embodiment of the present disclosure.

Referring to FIG. 13, a transmission point 10 according to the present disclosure may include a receiver 11, a transmitter 12, a processor 13, a memory 14, and a plurality of antennas 15. The plurality of antennas 15 mean that the transmission point 10 supports MIMO transmission and reception. The receiver 11 may receive various UL signals, data, and information from a UE. The transmitter 12 may transmit various DL signals, data, and information to a UE. The processor 13 may provide overall control to the transmission point 10.

The processor 13 of the transmission point 10 according to an embodiment of the present disclosure may process requirements of each of the foregoing embodiments.

Besides, the processor 13 of the transmission point 10 may function to compute and process information received by the transmission point 10 and information to be transmitted to the outside. The memory 14 may store the computed and processed information for a predetermined time, and may be replaced by a component such as a buffer (not shown).

With continued reference to FIG. 13, a UE 20 according to the present disclosure may include a receiver 21, a transmitter 22, a processor 23, a memory 24, and a plurality of antennas 25. The plurality of antennas 25 mean that the UE 20 supports MIMO transmission and reception. The receiver 21 may receive various DL signals, data, and information from an eNB. The transmitter 22 may transmit various UL signals, data, and information to an eNB. The processor 23 may provide overall control to the UE 20.

The processor 23 of the UE 20 according to an embodiment of the present disclosure may process requirements of each of the foregoing embodiments. Specifically, the processor may select resources to transmit a plurality of data, and transmit the plurality of data in the selected resources. The UE is configured to perform a transmission by sensing. If the UE fails in transmitting the data successively a predetermined number or more times, the UE may perform resource reselection.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point apparatus and the UE may be implemented such that the details described in the various embodiments of the present disclosure may be applied independently or implemented such that two or more of the embodiments are applied at the same time. For clarity, redundant description is omitted.

Further, in the description of FIG. 13, the description of the transmission point 10 is applicable in the same manner to a relay as a DL transmission entity or a UL reception entity, and the description of the UE 20 is applicable in the same manner to the relay as a DL reception entity and a UL transmission entity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

What is claimed is:

1. A method of performing sidelink communication by a user equipment (UE) in a wireless communication system, the method comprising:
    performing a resource reservation for transmitting a plurality of sidelink data units including a first sidelink data unit; and
    performing a resource reselection based on one or more resource reselection rules configured in the UE,
    wherein the one or more resource reselection rules comprise a first resource reselection rule that is satisfied based on that a first number determined by the UE becomes a second number configured in the UE,
    wherein the first number is related to consecutively skipped sidelink transmissions, and
    wherein the first number is incremented when none of first resources reserved for the first sidelink data unit is used.

2. The method according to claim 1, wherein the first resource reselection rule is configured in the UE through higher layer signaling.

3. The method according to claim 1, wherein the resource reservation comprises:
    selecting the first resources in a resource region.

4. The method according to claim 3, wherein the resource region is a sidelink resource pool configured in the UE.

5. The method according to claim 1, wherein the one or more resource reselection rules comprise a second resource reselection rule that is satisfied based on a resource reselection counter.

6. The method according to claim 5, wherein the first number is counted by the UE separately from a third number counted for the resource reselection counter.

7. The method according to claim 5, wherein in a case where the first resource reselection rule is satisfied, the resource reselection is performed irrespective of the resource reselection counter.

8. The method according to claim 5, wherein the second resource reselection rule that is satisfied based on a third number of sidelink data units transmitted by the UE becomes a fourth number configured for the resource reselection counter.

9. The method according to claim 1, wherein the one or more resource reselection rules configured in the UE comprises a third resource reselection rule which is satisfied based on a change of a configured resource region.

10. A non-transitory medium that is readable by a processor and recorded thereon instructions that cause the processor to perform the method according to claim 1.

11. A user equipment (UE) for wireless communication, the UE comprising:
    a transceiver; and
    a processor configured to control the transceiver to perform sidelink communication,
    wherein the processor is configured to perform a resource reservation for transmitting a plurality of sidelink data units including a first sidelink data unit, and to perform a resource reselection based on one or more resource reselection rules configured in the UE,
    wherein the one or more resource reselection rules comprise a first resource reselection rule that is satisfied based on that a first number determined by the UE becomes a second number configured in the UE,
    wherein the first number is related to consecutively skipped sidelink transmissions, and
    wherein the first number is incremented when none of first resources reserved for the first sidelink data unit is used.

12. The UE according to claim 11, wherein the first resource reselection rule is configured in the UE through higher layer signaling.

13. The UE according to claim 11, wherein the resource reservation comprises:
    selecting the first resources in a resource region.

14. The UE according to claim 13, wherein the resource region is a sidelink resource pool configured in the UE.

15. A device for wireless communication, the device comprising:
    a memory configured to store instructions; and
    a processor configured to perform operations by executing the instructions,
    wherein the operations performed by the processor comprise:
    performing a resource reservation for transmitting a plurality of sidelink data units; and
    performing a resource reselection based on one or more resource reselection rules configured in the UE,
    wherein the one or more resource reselection rules comprise a first resource reselection rule that is satisfied based on that a first number determined by the UE becomes a second number configured in the UE,
    wherein the first number is related to consecutively skipped sidelink transmissions, and
    wherein the first number is incremented when none of first resources reserved for the first sidelink data unit is used.

* * * * *